April 29, 1924.
J. E. HALE
1,492,209
VEHICLE WHEEL CONSTRUCTION
Filed Oct. 27, 1922
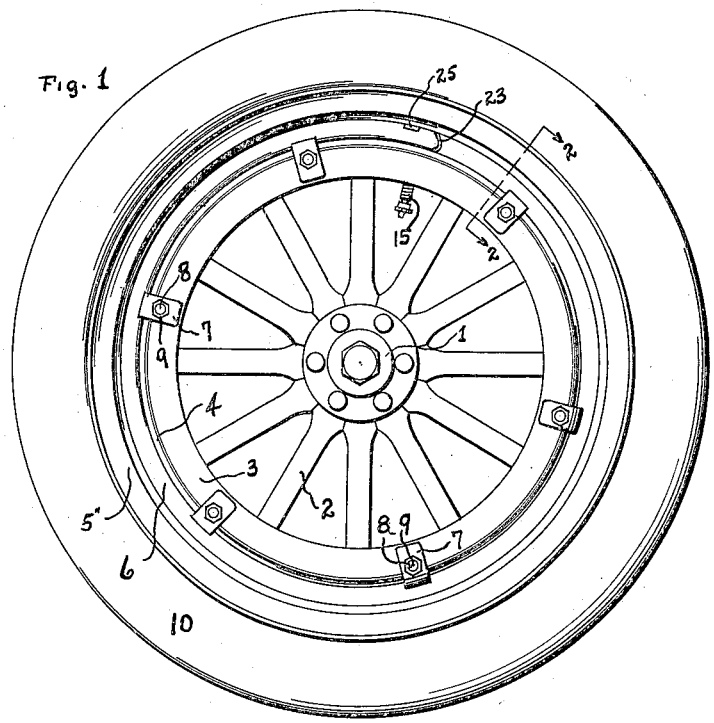
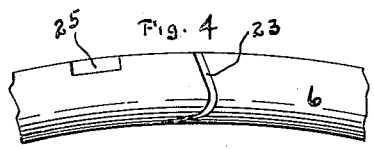
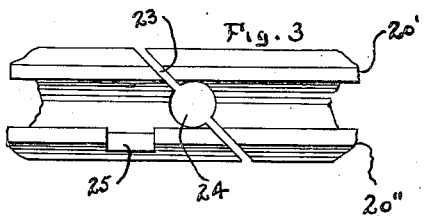
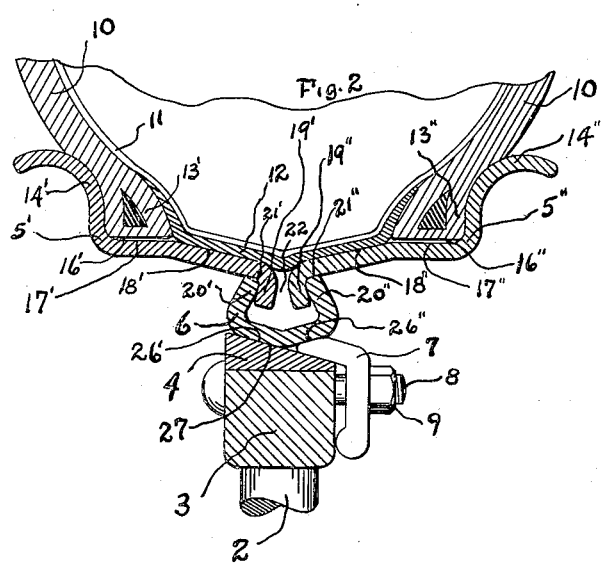
Inventor
JAMES E. HALE Patented Apr. 29, 1924.

1,492,209

UNITED STATES PATENT OFFICE.

JAMES E. HALE, OF AKRON, OHIO.

VEHICLE WHEEL CONSTRUCTION.

Application filed October 27, 1922. Serial No. 597,396.

*To all whom it may concern:*

Be it known that I, JAMES ELLIS HALE, a citizen of the United States, residing at Akron, in the county of Summit and State of Ohio, have invented new and useful Improvements in Vehicle Wheel Constructions, of which the following is a specification.

My invention relates to vehicle wheel constructions in which demountable rims and rim receiving wheels are fundamental elements of the wheel unit, the assembled unit being suitable for use with the conventional pneumatic or other resilient tire.

Custom has firmly established as the more or less basic utilitarian requirements of a practical wheel unit that it shall be light in weight, as unsprung weight is unduly hard on tires and excess peripheral weight increases the inertia to be overcome in starting and stopping; the demountable rim shall be easily mounted and demounted on and from the rim receiving wheel, and at the same time must be so devised as to be easily, quickly and securely fastened thereon by persons having little or no mechanical ability; the combination must be safe and strong enough to withstand all the stresses of vehicle operation; the unit must be such as can be produced at reasonable cost by conventional rim and wheel manufacturing methods; the demountable rim must be capable of safely and securely holding the inflated pneumatic tire whether mounted on the rim receiving wheel or being carried as a "spare;" and the demountable rim must be so devised that changing tires is easy and expeditious. Various wheel constructions have heretofore been suggested, but it has been observed that they fail to meet all of these requirements as completely as is desired, in any one design. For example, in certain constructions the demountable rim is difficult to manipulate in changing tires, others are heavy, and still others are expensive to fabricate.

The object of my invention is to provide a vehicle wheel which is light in weight, low in cost of manufacture, and in which the demountable rim is exceptionally easy to manipulate in changing tires, and readily mounted and demounted to and from the rim receiving wheel.

As shown hereinafter, this solution is attained by my discovery that it is possible to effect in a vehicle wheel, the combination of a rim receiving wheel and a circumferentially split rim in which the means for fastening the split portions of the rim together may also be made to serve as a means of mounting the rim on the rim receiving wheel, and in this combination secure all the desirable features as outlined above.

In practicing my invention, all these objects may be attained without impairing or detracting from the essential attributes of a practical rim receiving wheel with a coacting demountable tire rim. To the accomplishment of the foregoing and related ends, said invention, then, consists of the means hereinafter fully described and particularly pointed out in the claims.

The annexed drawing and following description set forth in detail certain mechanisms embodying the invention. Such disclosed means constituting, however, but one of various mechanical forms in which the principle of my invention may be used.

In the said annexed drawing, Fig. 1 is a side elevation of the complete vehicle wheel, including the rim receiving wheel and the demountable rim embodying my invention and with a pneumatic tire in position as when in use. Fig. 2 is an enlarged cross section of the wheel shown in Fig. 1 taken on the line 2—2, showing in detail the assembly of the tire, demountable rim and rim receiving wheel. Figs. 3 and 4 are details of the key ring, a part of the demountable rim which will be hereinafter explained.

My invention embodies principles sufficiently broad to enable its constructions to be applied to the design of wheels of various kinds; for instance cast steel wheels, disc wheels, and wood wheels, but I have chosen the conventional artillery wood wheel construction as a suitable type for detailed explanation. In the figures, 1 is the hub, 2 the spokes, 3 the wood felloe and 4 is the felloe band of the rim receiving wheel. The demountable rim is composed of three parts, two of which, 5' and 5", comprise the two portions of the circumferentially split tire receiving unit, each of which I have chosen to call a half rim. The third part 6 which fastens the two half rims together, I have chosen to call the key ring. The clamping devices for fastening the demountable tire rim on the wheel are composed of the clamps 7, the bolts 8, and nuts 9. The pneumatic tire is shown at 10 and in Fig. 2 the inner tube at 11, and the flap at 12. 13' and 13" are known as the beads of the tire and 14' and 14″ are the side flanges of the demountable rim which are known as the "straight side" type construction in conventional practice. In Fig. 1 the inner tube valve 15 is shown projecting through the felloe 3 of the artillery wheel as is conventional in automobile practice.

Due to the bursting pressure of compressed air in the inflated tire, the beads 13′ and 13″ are in pressure contact with the side flanges 14′ and 14″ respectively. On the contrary, it is conventional to have a space 16′ and 16″ between the under side of the beads and the portions of the rim immediately below, 17′ and 17″, which are called the bead seats. Manifestly a tight fit could not be permitted at this point because it would make it difficult to remove tires from the rims without mechanical aid. On the other hand, this space cannot be too large lest the flap 12 be blown under the beads by the air pressure. Because of the compressed air, flap 12 is in pressure contact with the rim in the space between the tire beads, and the rim surfaces of contact 18′ and 18″ are called the flap seats.

The demountable rim constructions employed under the scope of my invention are clearly set forth in the drawing. In Fig. 2 the half rims 5′ and 5″ have their mating edges 19′ and 19″ flanged inwardly and so constructed as to diverge slightly. The key ring 6 has a channel cross section in which the legs of the channel 20′ and 20″ project outwardly and converge to a slightly greater angle than the half rim flanges 19′ and 19″. The key ring flanges 20′ and 20″ are of sufficiently great length so that in an assembly of the two half rims and key ring, the outer edges of the key ring flanges 20′ and 20″ contact with the inner surface of the half rims 5′ and 5″ at points 21′ and 21″. Also in the assembly it will be noted that the mating edges of the half rims 5′ and 5″ are not in contact, there being a space 22 between them which is necessary because of the angularity of the flanges, to allow the half rims 5′ and 5″ to move slightly toward each other when withdrawing the key ring in a radial inward direction. The space 22 is bridged over by the flap 12 which will ordinarily be satisfactory, since it is fairly stiff and the space 22 will not be great.

In Fig. 2 it will also be noted that the flap seat portions 18′ and 18″ of the half rims are frusto-conical surfaces and of smaller diameter than the bead seats 17′ and 17″.

The half rims of the demountable rim combination are of substantially the same section around their complete circumferences except where the valve stem 15 projects between them, at which point each half rim will have a small semi-circular notch cut out. The key ring 6 is also of uniform cross section throughout its entire circumference except as indicated in the detail shown in Figs. 3 and 4. These figures show that the key ring is transversely cut on an angle at 23 and in the middle of this transverse cut is an opening 24 to accommodate the valve stem 15 (Fig. 1) with a loose fit. 25 is a notch of convenient size to permit the use of a screw driver in prying the ring from its position. In the wheel assembly the location of the transverse cut and screw driver notch are shown at 23 and 25, Fig. 1.

Having described the constructions employed in the demountable rim under my invention, I desire to point out that this construction is a meritorious one because it will permit the use of uniform gauge material for fabrication. In other words, both the half rims and key ring could be made of hot rolled strip steel if desired, a manifest advantage for reducing the costs. Also the freedom from attachments makes for less expensive manufacture.

Another meritorious feature of my invention is to the ease with which tires may be manipulated when changing. For instance, in removing the tire from the rim with the air pressure released, all that is necessary is to pry with a screw driver in the slot 25, springing the key ring 6 radially inwardly sufficiently to clear the outer edges of the half rim flanges 19′ and 19″. On account of the springiness of the key ring 6, this action will only disengage a relatively short portion of the key ring from the half rims, but with this much accomplished, it will then be very easy to grasp the disengaged portion in the hand or pry with the point of some tool, at the same time exerting a sidewise pull to the key ring, substantially parallel to the axis of the rim, which action will make the key ring fly out of position, entirely disengaging it from the half rim. With the key ring removed, the half rims can be easily lifted from the tire, this latter being extremely simple because of the spaces 16′ and 16″, provided beneath the beads, and more particularly because of the frusto-conical surface of the flap seat, making this clearance still more effective. Thus the whole operation of removing the tire from the rim consists of a very few extremely simple motions which should take only a few seconds.

Conversely the operation of fitting tires to the rim would be substantially the reverse of removing tires from the rim. For instance, the half rim might be lying flat on the floor and the tire with tube and flap in it would simply be lowered into a co-acting position with the inner tube valve stem fitted in the semi-circular slot at the edge of the half rim, whereupon the second half would be lowered into the tire in a co-acting position. With the tire, tube, flap and half rims assembled, the key ring would be fitted by engaging one end of the key ring over the two flanges of the half rim and following around with the screw driver or any other convenient tool until the ring completely snaps into position. In applying the key ring, it would of course be necessary to take the precaution of having the ends of the key ring come in such a way that the opening 24 in Fig. 3 would permit it to encircle the valve stem.

In the rim receiving wheel, it will be seen that the felloe 3 and felloe band 4 may be made narrow, consequently of light weight. This is made possible because of the discovery under the scope of my invention that the relatively small key ring which has already been disclosed as a component part of the demountable rim assembly is also designed to serve as the co-acting part in the mounting of the rim on the periphery of the wheel. The key ring is constructed with two frusto-conical surfaces 26' and 26'', one of which (26') is constructed to co-act with frusto-conical surface 27 of the felloe band 4, and since the transversely cut key ring is inextensible when encircled by the half rims, the mechanical principle of a taper fit between male and female parts having coacting frusto-conical surfaces is the device employed in providing a mounting for the demountable rim on the rim receiving wheel. As a means of securing the rim on the wheel against displacement or unintentional demounting, a plurality of clamping units are provided. The clamps 7 have wedge shaped noses which fit between frusto-conical surface 26'' of the key ring and the frusto-conical surface 27 of the felloe band in such a manner that tightening all the nuts 9 in all the clamps 7 has the effect of first, driving the key ring 6 laterally into a forced fit contact with the peripheral surface of the felloe band, and second, becoming true wedges by functioning as such.

In order to remove the rim from the wheel, it is only necessary to remove all the nuts 9 and the clamps 7, after which the coacting parts of the key ring and felloe band can be readily disengaged by virtue of their being narrow-frusto-conical surfaces.

In its capacity as a connecting piece of mechanism between the half rims and the felloe band and clamps, the key ring transmits all the stresses of vehicle operation which originate in the tire and extend throughout the body of the wheel, and at the same time it resists the bursting pressure stresses of compressed air, whether the tire is mounted on the wheel or whether it is carried as a spare.

In practicing my invention, I have found that it is not necessary to use driving lugs or traction plates to prevent the rim from creeping on the rim receiving wheel. This is because of the fact that my construction enables be to make the co-acting frusto-conical surfaces of the rim receiving wheel and key ring at a sufficiently flat angle so that in wedging the rim upon it, the friction will be sufficient to take care of the traction and breaking stresses.

While I have illustrated and described my invention in considerable detail, I desire to be understood that the construction may be materially varied to accommodate changes, modifications and substitutions in vehicle wheels, without departing from the scope and spirit of my invention as set forth in the appended claims.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a wheel construction, the combination of a circumferentially split tire carying rim having outwardly extending tire engaging flanges and adjacent inwardly extending and diverging flanges and a one piece, spilt locking ring having outwardly extending converging flanges adapted to fit over the said inwardly extending flanges on the tire carrying rim and also provided with a tapered surface over a portion of its inner periphery to afford a seat for the tire carrying rim on the wheel.

2. In a wheel construction, the combination of a tire carrying rim, split circumferentially so as to be removable laterally from the tire, the two half rims being provided on their adjacent edges with inwardly directed flanges, and a combined locking and rim supporting ring adapted to have interlocking engagement with the flanges and a seating surface to support the rim on the wheel, said seating surface being formed as a cone over a portion of the inner surface of the ring.

3. In a wheel construction, the combination of a tire carrying rim, split circumferentially so as to be removable laterally from the tire, said rim sections being formed throughout of metal of uniform thickness, flanges on the adjacent edges of the rim sections and a combined locking and rim supporting ring engaging said flanges, the inner surface of the ring being formed on a double cone for mounting on the wheel.

4. In a wheel construction, the combination of a tire carrying rim, split circumferentially so as to be removable laterally from the tire, said rim sections being formed throughout of metal of uniform thickness, flanges on the adjacent edges of the rim sections, said flanges flaring inwardly of the rim, and a combined locking and rim supporting ring having converging walls adapted to interlock with said flanges, the inner surface of the ring being formed on a double cone for mounting on the wheel.

5. In a wheel construction, the combination of a tire carrying rim, split circumferentially so as to be removable laterally from the tire, said rim sections being formed throughout of metal of uniform thickness, flanges on the under surfaces of the rim sections, said flanges flaring inwardly of the rim, and a combined locking and rim supporting ring having converging walls adapted to interlock with said flanges, the inner surface of the ring being provided with two oppositely faced conical bearing surfaces.

6. In a wheel construction, a sheet metal tire-carrying rim split circumferentially so as to be removable laterally from the tire, the rim sections being provided on their adjacent edges with inwardly directed flanges, and a split ring having radially interlocking engagement with said flanges said ring being adapted to operate as the sole support for the rim.

JAMES E. HALE.